Figure 6:
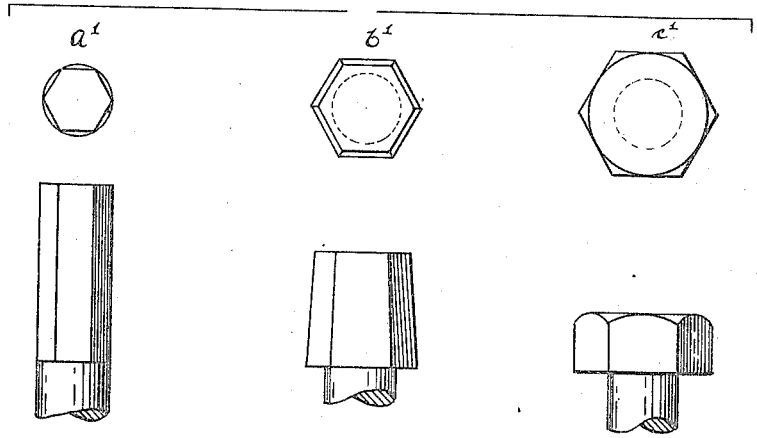

J. R. BLAKESLEE.
MANUFACTURE OF BOLTS AND THE LIKE.
APPLICATION FILED APR. 16, 1914.
1,255,504.
Patented Feb. 5, 1918.
3 SHEETS—SHEET 1.
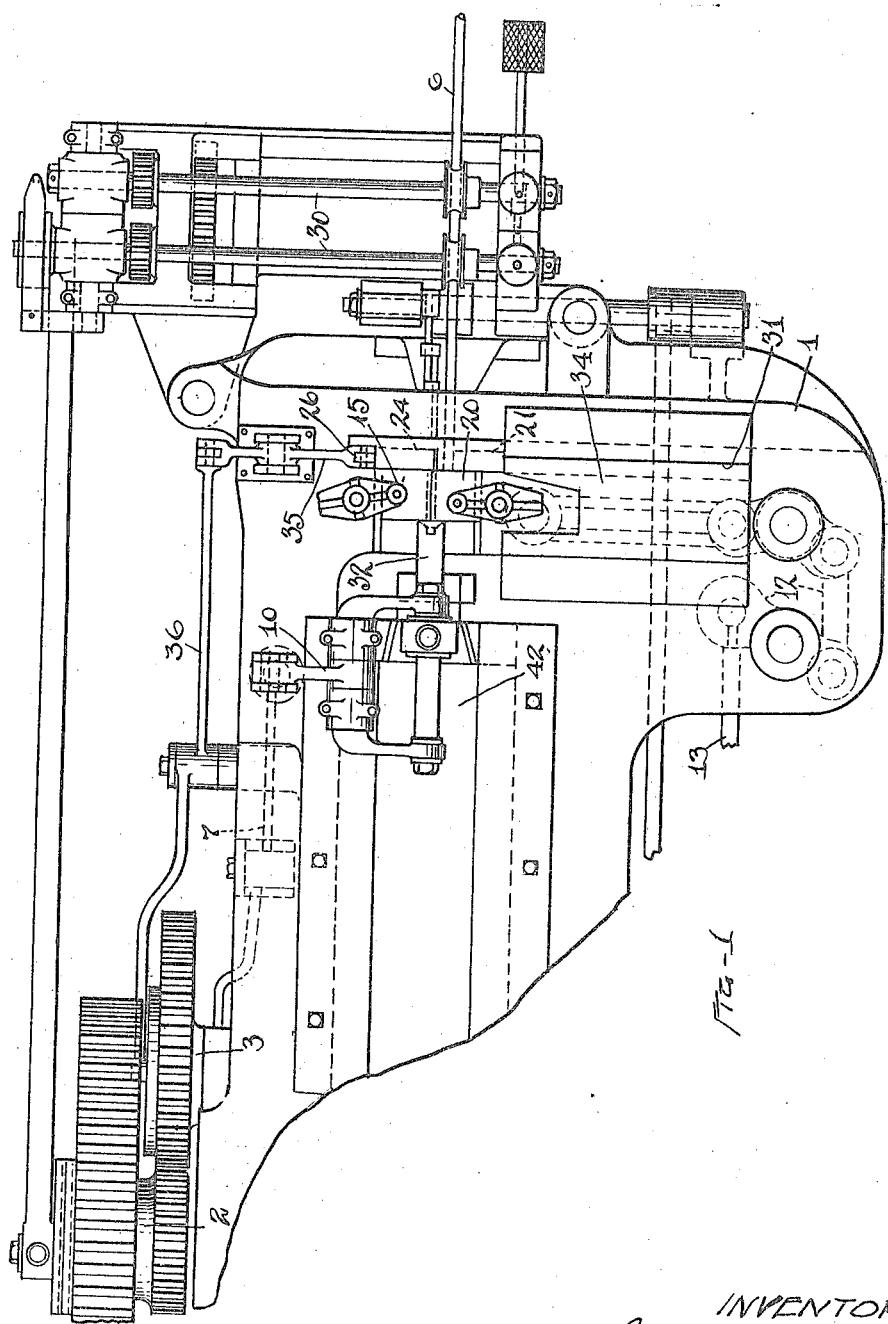

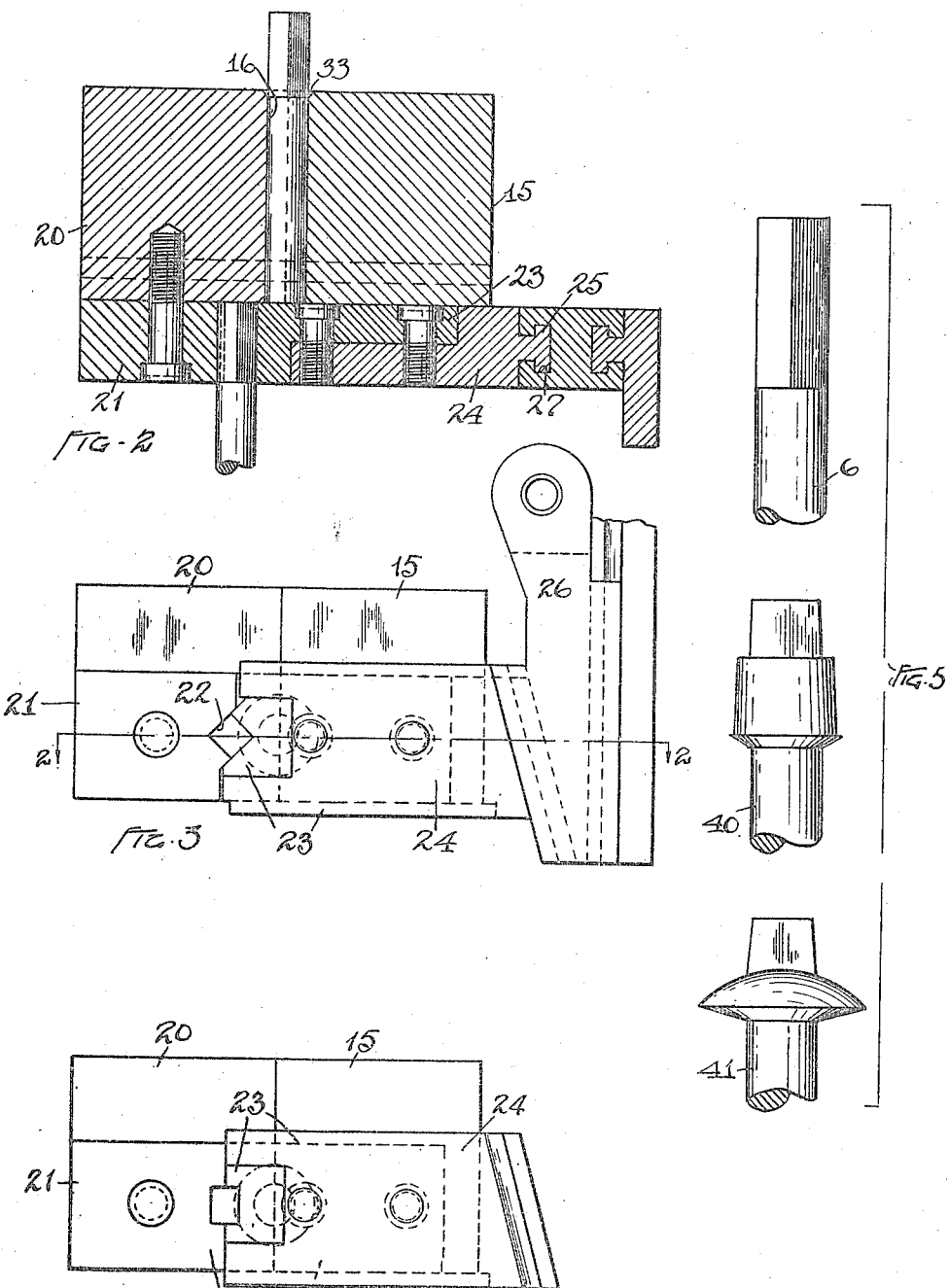

J. R. BLAKESLEE.
MANUFACTURE OF BOLTS AND THE LIKE.
APPLICATION FILED APR. 16, 1914.

1,255,504.

Patented Feb. 5, 1918.
3 SHEETS—SHEET 3.

WITNESSES-
O. M. Kappler
Thos. H. Fay

INVENTOR
John R. Blakeslee
BY Fay and Oberlin ATTY.

UNITED STATES PATENT OFFICE.

JOHN R. BLAKESLEE, OF CLEVELAND, OHIO, ASSIGNOR TO THE AJAX MANUFACTURING COMPANY, OF CLEVELAND, OHIO, A CORPORATION OF OHIO.

MANUFACTURE OF BOLTS AND THE LIKE.

1,255,504.          Specification of Letters Patent.        Patented Feb. 5, 1918.

Original application filed August 30, 1913, Serial No. 787,470. Divided and this application filed April 16, 1914. Serial No. 832,242.

*To all whom it may concern:*

Be it known that I, JOHN R. BLAKESLEE, a citizen of the United States, and a resident of Cleveland, county of Cuyahoga, and State of Ohio, have invented a new and useful Improvement in the Manufacture of Bolts and the like, of which the following is a specification, the principle of the invention being herein explained and the best mode in which I have contemplated applying that principle, so as to distinguish it from other inventions.

The subject of the present invention is a method of forming heads on bolts, screw spikes and the like, such method having been originally presented as a part of the invention forming the subject matter of my co-pending United States application Serial No. 787,470, filed August 30, 1913, entitled Bolt machines, from which the present application has been divided. The screw spikes which are now used in such large quantities are preferably formed with a flanged head as in the old construction, and also with a nut on top of the head to facilitate the engagement of the bolt in the tie. The bolts are also threaded, but the threading is performed in a separate operation from those which will now be described, and hence need not be taken up at present.

It has been customary to form the spikes in two separate and distinct operations to secure the heading effect which has been described. This method of forming them takes considerable time, and it is impossible to turn out any large number in a day by this method. Accordingly, I have designed a new and improved method of forming the bolts by which the heading operation and the partial forming of the next bolt from the bar of stock are performed practically simultaneously, being preceded slightly by the cutting off of the bolt which is to be headed, from the bar of stock. By this method it is possible to greatly increase the number of bolts which can be made in a single machine in a day and the mechanism which I have provided for carrying out this method is in general so similar to the mechanism now used in the old process that it is not necessary to re-design or change to any great extent the forging machines which have hitherto been in use for this purpose. I here illustrate one approved type of mechanism for carrying out the present method, such mechanism forming the subject matter of my co-pending application above referred to, although it will be understood that I do not limit the present invention to use with the specific mechanism illustrated.

The annexed drawing and the following description set forth in detail one approved method of carrying out the invention, such disclosed mode, however, constituting but one of the various ways in which the principle of the invention may be used.

In said annexed drawings:—

Figure 7:
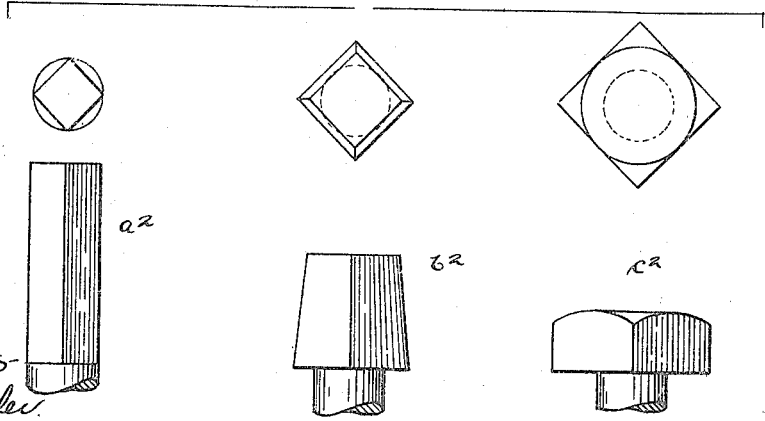

Figure 1 is a plan view showing more or less diametrically the layout of the machine and the general construction; Fig. 2 is a horizontal section on the line 2—2, of Fig. 3 illustrating the positions of the various dies at the moment of cutting off a partially formed track bolt; Fig. 3 is a side elevation showing the squeezing or forming dies together with the means for operating one of the same; Fig. 4 is a side elevation of a different form of squeezing die; Fig. 5 shows in side elevation the track bolt in various stages of its formation; and Figs. 6 and 7 show bolts or spikes in the several stages of manufacture as made by the present improved process.

Referring to Fig. 1, it will be seen that the machine is in general very similar to the machines which have hitherto been used for forming bolts, spikes, rivets, and the like, the general construction of which is so well known that it is unnecessary to describe it in detail at this point. A suitable framework 1 is provided in which there is transversely disposed a main crank shaft 2 driven by any suitable means, such main shaft driving a secondary shaft 3, the latter being the shaft from which the various operating mechanisms are driven. The gripping and forming dies are suitably mounted in slideways 31 disposed transversely in the forward end of the machine, and of course operate simultaneously upon a bar of stock 6 which is fed into the forward end of the machine by any suitable feeding mechanism 30. Disposed at substantially right angles to the direction of movement of the gripping and forming dies are the heading dies or tools 32 of which there are two, such two dies being carried by the usual header slide 42 and being adapted to successively operate upon the spike which is held by the gripping dies, this operation necessitating the vertical sliding of the tools 32 as well as their longitudinal reciprocation. Any suitable mechanism for so vertically operating the heading dies may be used, the present operating means including a lever 7 pivotally mounted upon the side of the machine and operated by a suitable cam upon the secondary shaft, the lever 7 being attached at its forward end to a second and shorter lever 10 which is pivotally mounted upon the top of the frame and engages the slide 42 carrying the heading dies. This mechanism provides for the vertical movement of the heading slide, while the reciprocation of the same is secured by a cam operated by the main shaft and attached by suitable mechanism to the heading slide.

The forming slide 34 is operated by the usual link mechanism which may be driven by a connecting rod 13 operated by a suitable cam upon the secondary shaft.

The particular parts of the mechanism to which attention is now called are best shown in Figs. 2, 3 and 4. A gripping die 15 is fixed at the right of the aperture in the machine through which the bar of stock is fed. This die member is provided with a semi-circular groove 16 which is adapted to receive the bar of stock, or rather a portion cut from the same, the forward end of this die member having a slightly enlarged disk-like groove 33 adapted to coöperate with the heading die to produce the proper head upon the spike. Attached to and operated by a die slide 34 shown in Fig. 1 is a second gripping die member 20 similar in construction to the fixed die and provided at its rear face with a cutting edge adapted to shear a portion of the bar of stock from the remainder of the bar, thus cutting off a suitable length to be formed into the spike. Attached to the rear face of the movable gripping die 20 is a forming or squeezing die 21 which is provided with rectangular squeezing jaws 22 adapted to coöperate with a similarly formed die member 23 attached to a plate 24 which is slidably mounted in line with the forming die first described. The plate is provided at its rear side or edge with a T-shaped flange 25, such flange extending away from the edge at an angle to the direction of movement of the plate and being engaged by a wedge-shaped member 26 having a T-shaped groove 27 of the same size and shape as the T-shaped flange.

The operating means for the wedge 26 which is operated in a vertical direction, and for the gripping die member 20 and forming die 21 which are attached together, are so timed that as a bar of stock is fed in between the squeezing dies 21 and 23 and also between the fixed and movable die members 20 and 15 that the plate 24 is first operated to contact the stock when the gripping die 20 moves across such stock, shearing it off and holding it between the dies 20 and 15. The squeezing die 21 is meanwhile moving toward the die 23 and squeezes the stock against the same, forming it as shown at the top of Fig. 5.

The cut off portion of the stock is held in the semi-circular grooves 16 in the gripping dies 15 and 20 while being upset to form the head. As soon as the squeezing die 21 has moved to its limiting right-hand position, thus forming the stock, the plate 24 moves back this action preventing too great chilling of the metal of the stock. The end of the stock bar has thus been formed into roughly rectangular cross-sectional form. The die members 20 and 21 are stationary while the heading dies operate to form the rounded flange and the rectangular projection on top of the same at the projecting end of the piece of stock which is held between the gripping dies but the die 23 is moved away from the stock, as soon as the latter is squeezed, for the purpose stated. The moving die member 20 then returns to its normal position, thus permitting the newly formed spike to drop from between the moving and fixed dies, such action being made certain by suitable mechanism which kick the spike at this point.

The wedge member 26 which operates the plate is operated from the secondary shaft 3 by means of a pivoted short lever 35 and a longer lever 36 attached to a connecting rod which is pivotally attached to the short lever. A suitable cam of course is provided on the secondary shaft for oscillating the longer lever 36, the cam being properly timed with respect to the timing of the cam which operates the gripping and forming dies upon the other side of the machine.

The forming dies which have just been described are shown as forming a square head upon the spike, but of course if desired a rectangular or other form of head may be formed, in which case suitable dies 38 and 39 such as those shown in Fig. 4 will be substituted for the square dies shown in Fig. 3, the operation being in no way affected by this change.

In Fig. 5 the various stages in the formation of the spikes are shown. The figure at the top shows the bar of stock 6 which has had its end squared up by the forming dies. The figure in the center shows the spike 40 when it has been cut off from the bar of stock and after the first heading operation which occurs of course while the bolt is being held between the fixed and movable gripping dies. The figure at the bottom shows the spike 41 after the second heading operation, the spike then being removed from between the dies.

Although the present process and the machine have been shown as adapted to the manufacture of blanks for formation into spikes, the present process and machine are in no way limited to this special product and in fact the distinctions which exist between the present invention and the old method and machine for making bolts, spikes and the like, are such that a much improved bolt or spike of any kind can be made by the present process.

It is possible, however, by preliminarily compressing the end of the stock to roughly the desired cross sectional form to prevent the formation of the fin which is produced with present methods and the present process includes this preliminary compression. Thus in Fig. 6 at $a'$ I show a bar of stock which has had its end formed hexagonal and at $b'$ the same stock is shown after the first heading operation when it is partially upset. As the stock is already formed into the desired cross sectional shape there is no fin produced in either the first or second heading operations, the finished bolt being shown at $c'$ and it will be noticed that there is no fin present as on the bolts as made by the usual method. It will, of course, be readily understood that I do not limit myself to any particular form of bolt as either screw, hexagonal, rectangular, or in fact any other desired polygonally shaped bolt or spike may be produced in the present process by a suitable die.

I therefore particularly point out and distinctly claim as my invention:—

1. The improvement in the art of making bolts, spikes and the like, which consists in cutting off a section of a stock bar and simultaneously compressing the new end of the bar to roughly the desired cross-sectional form, and then heading such cutoff portion.

2. The improvement in the art of making bolts, spikes and the like, which consists in cutting off a section of a stock bar and simultaneously compressing the new end of the bar to roughly the desired cross-sectional form, and then heading such cutoff portion by longitudinal pressure.

Signed by me, this 13th day of April, 1914.

JOHN R. BLAKESLEE.

Attested by—
D. T. DAVIES,
JNO. F. OBERLIN.

Copies of this patent may be obtained for five cents each, by addressing the "Commissioner of Patents, Washington, D. C."